US008032558B2

(12) United States Patent
Carter et al.

(10) Patent No.: US 8,032,558 B2
(45) Date of Patent: Oct. 4, 2011

(54) ROLE POLICY MANAGEMENT

(75) Inventors: Stephen R. Carter, Spanish Fork, UT (US); Duane Fredrick Buss, West Mountain, UT (US)

(73) Assignee: Novell, Inc., Provo, UT (US)

( * ) Notice: Subject to any disclaimer, the term of this patent is extended or adjusted under 35 U.S.C. 154(b) by 220 days.

(21) Appl. No.: 11/621,762

(22) Filed: Jan. 10, 2007

(65) Prior Publication Data

US 2008/0168532 A1    Jul. 10, 2008

(51) Int. Cl.
*G06F 7/00* (2006.01)
*G06F 17/30* (2006.01)

(52) U.S. Cl. ............................................. 707/786
(58) Field of Classification Search .................. 707/786, 707/999.009
See application file for complete search history.

(56) References Cited

U.S. PATENT DOCUMENTS

| | | | |
|---|---|---|---|
| 5,911,143 A | 6/1999 | Deinhart et al. | |
| 6,023,765 A | 2/2000 | Kuhn | |
| 6,088,679 A | 7/2000 | Barkley | |
| 6,434,607 B1 | 8/2002 | Haverstock et al. | |
| 6,732,100 B1 | 5/2004 | Brodersen et al. | |
| 6,751,657 B1 * | 6/2004 | Zothner | 709/220 |
| 6,775,658 B1 * | 8/2004 | Zothner | 706/47 |
| 6,785,822 B1 | 8/2004 | Sadhwani-Tully | |
| 6,871,231 B2 | 3/2005 | Morris | |
| 6,917,975 B2 | 7/2005 | Griffin et al. | |
| 6,950,825 B2 | 9/2005 | Chang et al. | |
| 6,965,751 B2 | 11/2005 | Koga et al. | |
| 7,124,192 B2 | 10/2006 | High, Jr. et al. | |
| 2002/0083335 A1 * | 6/2002 | Kilkkila | 713/200 |
| 2003/0037263 A1 * | 2/2003 | Kamat et al. | 713/202 |
| 2004/0162894 A1 | 8/2004 | Griffin et al. | |
| 2004/0162905 A1 | 8/2004 | Griffin et al. | |
| 2004/0162906 A1 | 8/2004 | Griffin et al. | |
| 2005/0044097 A1 * | 2/2005 | Singson et al. | 707/102 |
| 2005/0044269 A1 | 2/2005 | Abdelkrim | |
| 2005/0097166 A1 | 5/2005 | Patrick et al. | |
| 2006/0218394 A1 * | 9/2006 | Yang | 713/167 |
| 2008/0092223 A1 * | 4/2008 | Setia et al. | 726/11 |

FOREIGN PATENT DOCUMENTS

| | | |
|---|---|---|
| EP | 1061431 A2 | 12/2000 |
| WO | WO-02097591 A | 12/2002 |

OTHER PUBLICATIONS

"Beyond Roles: A Practical Approach to Enterprise User Provisioning", http://www.idsynch.com/docs/beyond-roles.html, M-Tech Information Technology, Inc.,(2006),1-19.
"Role-Based Access Control", http://en.wikipedia.org/wiki/RBAC, Wikipedia,(Nov. 20, 2006).
Durham, D., "The COPS (Common Open Policy Service) Protocol", http://www.ietf.org/rfc/rfc2748.txt, Network Working Group, Request for Comments: 2748,(Jan. 2000).

* cited by examiner

*Primary Examiner* — Yicun Wu
*Assistant Examiner* — Patrick Darno
(74) *Attorney, Agent, or Firm* — Schwegman, Lundberg & Woessner, P.A.

(57) ABSTRACT

In various embodiments, techniques for role management systems are provided. According to an embodiment, a method is provided to allow a role management system to be configured, modified, and restricted. Specific roles assignments may be decorated to be meaningful to an application but which are not generally applicable to an original role specification. A Policy Enforcement Point (PEP) role request response may be modified by an augmentation service, which evaluates a resource association to identify an appropriate resource profile. Resource decorations are identified by the selected profile, and are applied to the role request response.

19 Claims, 5 Drawing Sheets

ROLE POLICY MANAGEMENT

FIELD

The invention relates generally to security and more particularly to administering resource access using role policy management techniques.

BACKGROUND

Increasingly enterprises are faced with numerous internal users having different access requirements that span a large number of applications, networks, and systems. Maintaining the security of such modern dynamic enterprises is a critical and challenging task. In some industries, such as banking, the federal government has promulgated rules and regulations that require a certain degree of security. Thus, enterprises are not only concerned with their reputation but face potential civil liability for security breaches. The challenge lies in efficiently and securely provisioning system access to reflect constantly changing user responsibilities and computing environments.

Historic methods of manually granting individual user access on a resource by resource basis long ago proved administratively infeasible for organizations of even moderate size. Role Based Access Control (RBAC) systems advanced the art by attempting to secure and streamline user administration via constructing and maintaining a formal model of user privileges grouped into roles.

However, such models have scaled poorly because many users are unique; thus, resulting in role proliferation. For example, user diversity is often represented using new applications, departments, or systems, which are added to the enterprise security model. Where fine-grain role approaches are required, the number of roles may equal the number of users (or even exceed the number of user if users have many roles); therefore, the advantage of grouping is often lost. Application of policy rules as a complement to roles has allowed for greater flexibility and fewer generalized static role definitions. Nonetheless, the combination of increasingly complex Information Technology (IT) infrastructures, more diversified users requiring fine granularity access privileges, and growing numbers of users (including employees, subcontractors, partners, vendors, etc.) have shown that these conventional tools and processes to manage security are breaking down.

Consequently, what was considered a valuable security model for an enterprise has now become an administration and maintenance challenge.

Also problematic is the task of converting an enterprise to a role management system in the first place. Traditional role management systems are not conducive to the integration of existing systems to use roles nor do they provide the mechanisms necessary to allow multiple, disparate systems that are related only by the role information to add role functionality without affecting other applications using the role management system.

Accordingly, what is needed are mechanisms to better provision fine-grained role extensions without impacting existing role management systems.

SUMMARY

In various embodiments, techniques for role management systems are provided. More specifically, and in an embodiment, a method is provided for extending a generalized role definition. A role request and role assignment are received. The role request identifies a principal and a Policy Enforcement Point (PEP) service that acts on behalf of the principal. The role assignment represents permissible roles of the principal. Next, a resource association is evaluated in response to the role request and in response to the role assignment in order to identify a resource profile. One or more resource decorations are applied in response to the identified resource profile. The modified role assignment is sent to the PEP service for enforcement.

DETAILED DESCRIPTION

Figure 1:
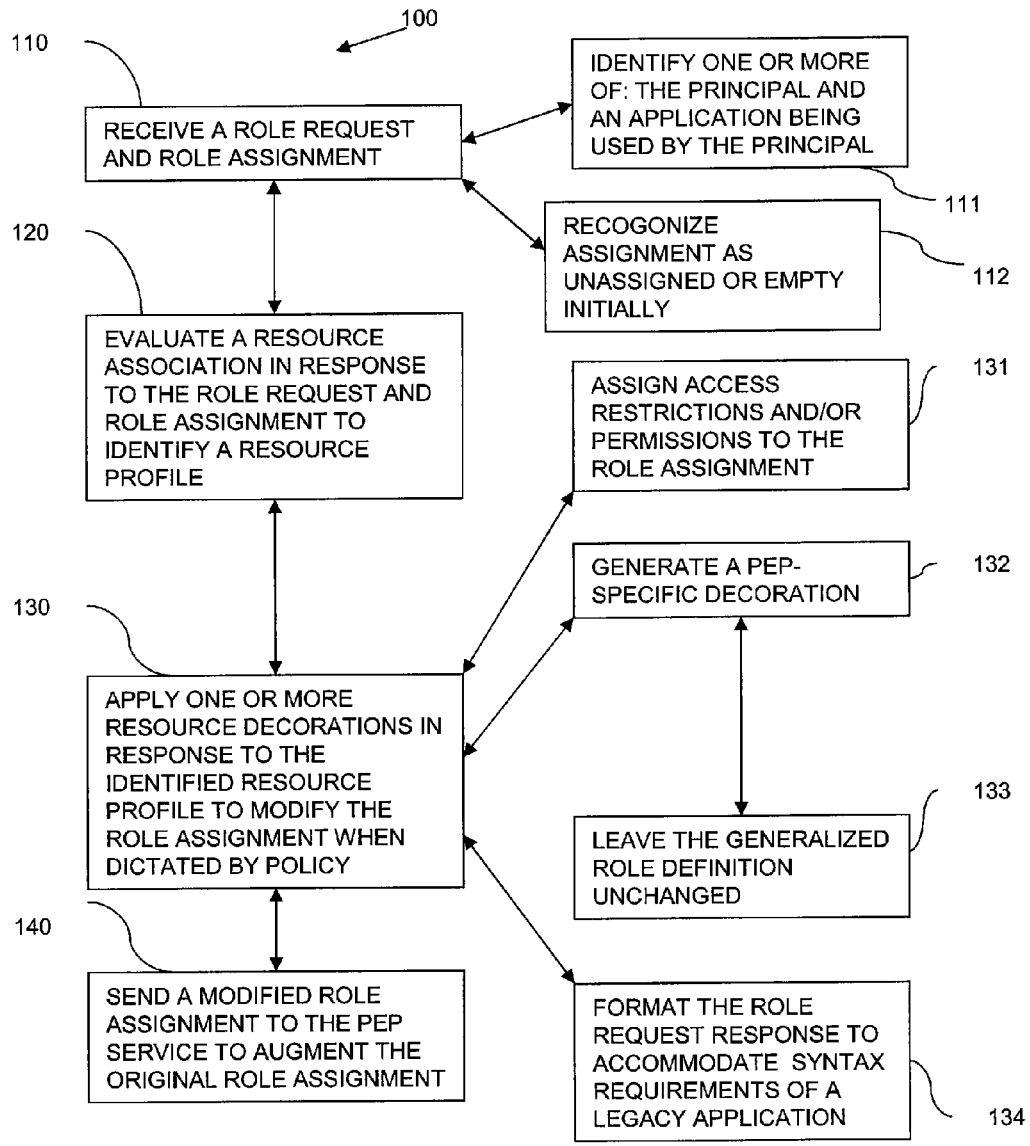
FIG. 1 is a diagram of a method for extending a generic role definition, according to an example embodiment.

The term "resource" as used herein refers to an electronic entity, an application or set of applications, a data store, a proxy, a directory, a service, or physical devices such as computers or peripherals etc. Resources may represent physical or logical entities.

A "principal" is a type of resource designation identifying a resource that requests access to or communicates with other resources. For example, a principal may be a user, an automated application, or an automated service that attempts to access another resource, such as a website, etc.

In various embodiments of the invention, the term "identity" is used. An identity refers to an electronic identifier, attribute, or representation for a resource (e.g., physical and logical). An identity may be assigned to a resource after authentication. An identity is authenticated via various techniques (e.g., challenge and response interaction, cookies, assertions, etc.) that use various identifying information (e.g., identifiers with passwords, biometric data, digital certificates, digital signatures, etc.). A "true identity" is one that is unique to a resource across any context that the resource may engage in over a network (e.g., Internet, Intranet, etc.). However, each resource may have and manage a variety of identities, where each of these identities may only be unique within a given context (given service interaction, given processing environment, given virtual processing environment, etc.).

"Role Based Access Control" (RBAC) is a technique that specifies role relations, interactions, and restrictions as a part of a role object model. Stated another way, RBAC is a security model to administer system access rights based on role assignments and rules (role policy).

As used herein, a "Role Config" is a data store or data structure having a collection of role definitions and which may also include specification information, separation of duties, rights, and privileges, inheritance specification, hierarchical location etc. Sometimes, role definitions include privileges associated with their hierarchical subordinates.

A "Policy Enforcement Point" (PEP) service is a module that enforces policy, including access restrictions and permissions, for resources within its purview. Policy decisions may be provided from a Policy Decision Point (PDP). In a general case, a PEP service makes a request of a PDP of behalf of a requestor; the PDP access a Role Calculator Engine (RCE) to have the roles for the role(s) calculated; and then the PDP makes a final policy decision and distributes the information the to the PEP for subsequent enforcement. It may also be that the PEP modules submit access requests on behalf of principals or resources to a RCE; in these cases the RCE may be viewed as a type of PDP. In fact, the RCE may include both its own PDP and PEP.

A "PEP Config" is a data store or data structure that provides a PDP and/or a RCE with PEP specific processing context information. This may include proxy, connection state, IP subnet, domain information, or information on how to retrieve PDP specific information, etc.

It is noted that throughout the discussion included herein, the RCE may be viewed as a special type of PDP that performs the novel processing discussed herein and below.

A PDP service supplies role policy and specifications associated with a resource to a RCE (specialized type of PDP) or PEP service. Again, it is noted that the RCE is itself a PDP. A PDP may also deliver this same information to an augmentation service. Additionally, a PDP may evaluate a modified role assignment and present a final disposition to the PEP for enforcement.

"Role Policy" defines the relationship between a resource and one or more roles. Role Policy may augment the use of a generic role by specifying activation, deactivation, creation, modification, decoration, association, and/or usage restraints. For example, role policy may dictate that a particular role may only be assigned to a principal if specific conditions are met (e.g., time of day (temporal restraint), subnet (network constraints), memory or processor capacity (hardware configuration), etc.).

A "Resource Decoration" defines a processing context to an augmentation service. The processing context may include additional access restrictions or permissions, formatting and syntax requirements (as an example this may be used in some embodiments to accommodate legacy applications).

A "Resource Association" defines and identifies relationships between resources, including role requests and role assignments, and maps particular relationships to resource profiles. The profiles map to context specific access permissions or restrictions.

A "Resource Config" includes one or more resource profiles or specifications. Each resource profile identifies one or more resource decorations that may be applied to a given role assignment or resource association. In other words, the resource config details the restrictions that may be imposed on a particular resource or processing context for that resource.

An "Augmentation service" is used as an augmentation calculator that accepts as inputs one or more roles, policies associated with those roles, role requests, or role assignments supplied by a PDP service or RCE and uses the identified resource associations in connection with the resource config to select a resource profile and acquire the appropriate resource decorations. This permits the augmentation service to provide more fine-grained roles for a general role assignment, permits roles to be reused with role enabled systems, and allows new access points to be defined that interact with existing PEP/PDP's. The output of the augmentation service is in the same or similar format as the inputs supplied by the PDP service or RCE such that multiple instances of the augmentation service can be chained together based on configuration setups to further partition the access permissions and restrictions. The augmentation calculation module may be a generalized, reusable module or logic specific to a given application.

Finally, the "Role Calculator" evaluates access requests (e.g. the PEP context) in terms of the roles of one or more agents and the resources using role policy to make a determination concerning the access request or role action (e.g., activation, interrogation, etc.). Thus, the role calculator may associate one or more roles to a requesting resource and evaluate access requests for the resource by application of role policy to that resource's role assignments. The Role Calculator is part of the RCE.

As used in this document or disclosure, the terms "role, decoration, association, and interaction" may refer to specific instances, patterns, or templates.

Various embodiments of this invention can be implemented in existing network architectures and RBAC systems. For example, in some embodiments the techniques presented herein are implemented in whole or in part in the Novell® network, proxy server products, operating system products, data center products, and/or directory services products distributed by Novell®, Inc. of Provo, Utah. More specifically, embodiments of the invention may be implemented in the Novell® Access Manager, Identity Manager products, and Bandit projects among others.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-5.

FIG. 1 is a diagram of a method 100 for creating more granular (finer-grained) roles by extending a generic role definition without affecting other uses of the existing role management system, according to an example embodiment. The method 100 (hereinafter "role extension service") is implemented as instructions in a machine-accessible and readable medium. The instructions when executed by a machine perform the processing depicted in the FIG. 1. The role extension service is also operational over and performs within a network. The network may be wired, wireless, or a combination of wired and wireless.

As will be more fully described herein and below, the role extension service permits a generic role assignment to be modified with access permissions or restrictions specific to a given PEP, application, and/or principal via an augmentation service. The "decoration of a role assignment" is the augmentation of a role specification to allow other constraints to be considered which were not anticipated by the standard (generic) role structure. The result of the "decoration" in many situations, but not all, is a modification of the access permissions of a given role assignment. Thus, in some cases the result of the decoration may not change any access permissions. It is also noted that in some cases the decoration may enhance or transform the original role assignment. Thus, the decoration does not have to be restrictive in each case and embodiment presented herein.

At 110, the role extension service receives a role request and role assignment. The role request identifies a requesting PEP service and the principal that the PEP service is representing. In some embodiments, it is noted that the principal may be anonymous from the outset. The PEP is originally specified when a specific resource access is requested in a certain context by the principal. The role assignment may represent one or more permissible roles of the principal or, in another embodiment, it may be empty or unassigned. A role request represents a principal's desire to access one or more resources. In some situations, it may be necessary that a principal be assigned more than one role to receive access to a particular resource. According to an embodiment, the role request and role assignment are sent from a RCE that previously made the role assignment in response to the role request. More than one role assignment may be associated with a given role request. The role extension service may receive the role request and role assignment by "intercepting" a transmission originally intended for a PEP service. Where an application makes a role request on behalf of a principal, the role request may include information identifying the application and principal. Optionally, at 111, the role extension service identifies the requesting principal and/or an application being used by the principal.

It may also be the case, at 112, that the role extension service recognizes that the role assignment is initially unassigned or is empty. Thus, in some cases, there is no initial role assignment at all.

At 120, the role extension service evaluates a resource association in response to the role request and role assignment to identify a resource profile within the resource config module. To evaluate a resource association the role extension service may consider the identified relationship between one or more of the following: the true identity of the principal, the role request, the role assignment, the PEP service, the application, membership inheritance requirements, dynamic membership exclusions based on temporal restraints, etc. After selecting the resource profile at 120, the role extension service applies the resource decorations identified in the selected resource profile to the role assignment at 130. This is to modify the original role assignment when and if such a modification was dictated by policy. In this manner, generalized role definitions may be modified and extended through decorating a role assignment without burdening the generic role specification. One result is that fine-grain security requirements for specific applications, PEPs, and principals may now be resolved without affecting other uses of a security management system. Another result may be a transformation or enhanced version of access permissions. Although the stand-alone operation of a generic security management system is not explicitly shown in the FIG. 1, it is shown and described in more detail below with respect to the FIG. 5. Continuing the discussion of 130 in the FIG. 1, specific roles and role hierarchies may be decorated or associations specified that are meaningful to the application but not generally applicable to a general role specification case.

By way of example, resource decorations may implement the limitation that membership inheritance from the role hierarchy for a given application be restricted to only one level whereas another application must inherit from each available level. Such a situation may arise where manager A, a second level manager, supervises first level managers B and C. Manager B oversees only regular salaried employees and manager C oversees outside contract workers. Manager A, in her role as second level manager, should be able to access all the information about manager B, manager C, and the subordinates of manager C (all regular salaried employees) but not the confidential information relating to the outside contract workers that manger B supervises.

Returning to the discussion of the FIG. 1, at 131 and according to an embodiment, the role extension service applies access restrictions and/or permissions to the role assignment; or applies any transformation, which in some cases may be enhanced access permissions. Optionally, at 132 the role extension service generates one or more PEP specific role decorations. At 133, and as previously noted above, the role extension service leaves the generalized role definition unchanged so that other systems/services interacting with or using a traditional RBAC system may continue to function normally and unabated. In an embodiment, at 134 the role extension service formats the role request response to accommodate formatting and syntax requirements of any legacy application, service, or system. In other words the role extension service may ensure that the augmentation that was performed goes unnoticed by subsequent consuming services or systems. In this manner, the augmentation can be seamlessly integrated into legacy systems or services.

At 140, the role extension service sends the modified role assignments to the PEP service. The PEP service may subsequently use the modified role assignments for enforcement against subsequent processing actions of the requesting principal. This augments the general role assignment beyond what was initially assigned.

In this way, a coarse-grain role definition may be extended to create one or more fine-grain role extensions and without affecting how other applications, services, systems, and resources use the coarse-grain role.

In an embodiment, the role extension service may itself be viewed as an enhanced type of PDP service. In fact, in some cases the role extension service may be implemented within a PDP as an enhanced service of the PDP.

Figure 2:
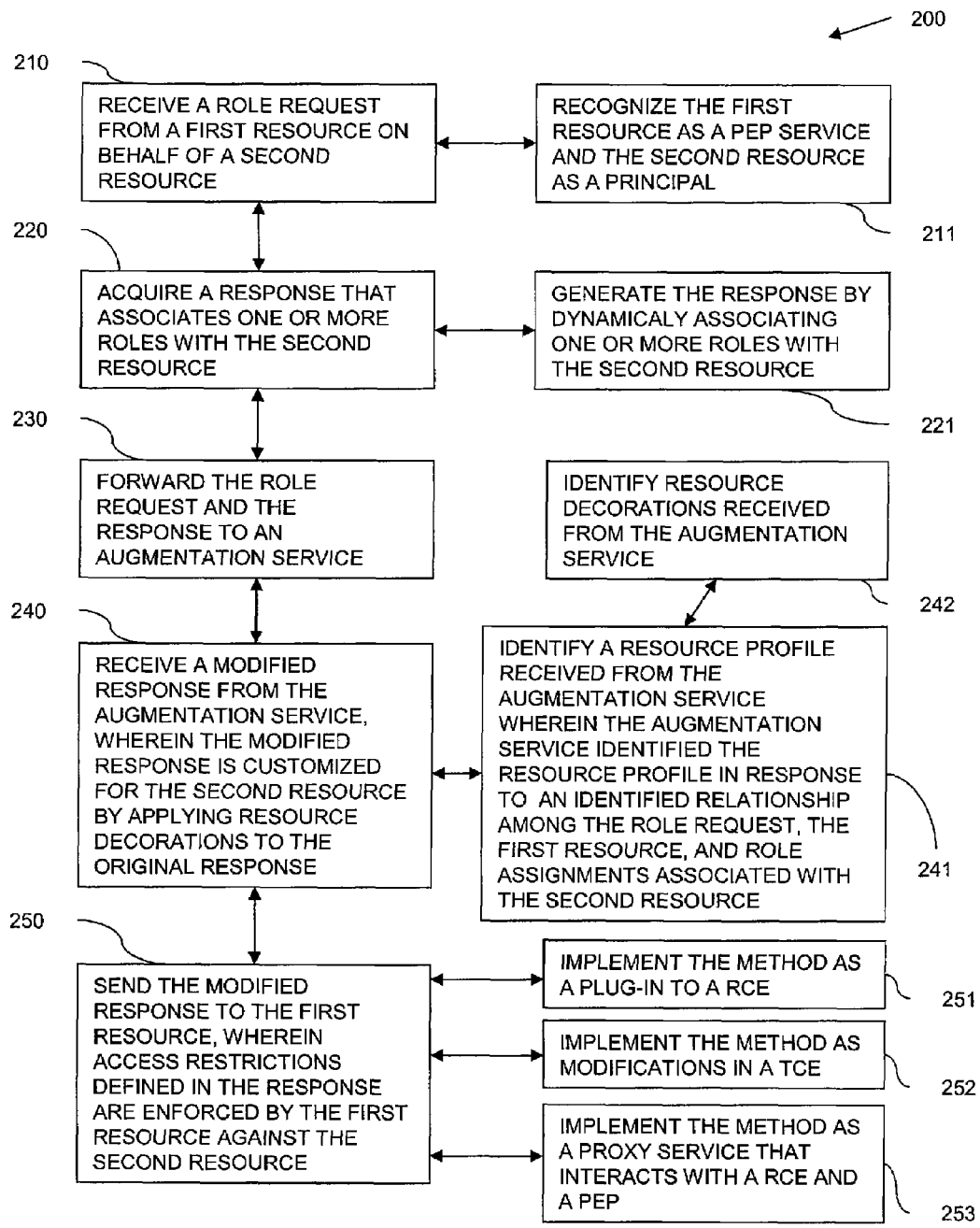
FIG. 2 is a diagram of a method for modifying a role request response, according to an example embodiment.

FIG. 2 is a diagram of a method 200 for modifying a role request response, according to an example embodiment. The method 200 (hereinafter "proxy service") is implemented as instructions in a machine-accessible and readable medium. The instructions when executed by a machine perform the functions depicted in the FIG. 2. The processing is also operational over and performs within a network. The network may be wired, wireless, or a combination of wired and wireless.

At 210, the proxy service receives a role request from a first resource on behalf of a second resource. It may also be the case, at 211, that the proxy service recognizes the first resource as a PEP service and the second resource as a principal. The role request may be sent from a PEP service directly or arrive at the proxy service indirectly.

At 220, the proxy service acquires a response that associates one or more roles with the second resource. The response may be acquired from a role calculator. The roles, which are associated with the second resource, may include each available role or may include just a subset of roles of the second resource's permissible roles, depending on the access rights sought by the second resource. Environmental conditions such as hardware limitations, network constraints, software configurations, time of day, location, etc. may also determine which roles are associated with the second resource. For example, some roles may not be accessible to the second resource if the second resource is requesting access in a remote physical environment, such as through a virtual private network connection. Alternatively, at 221 the proxy service may generate the response itself by dynamically associating one or more roles with the second resource.

The proxy service forwards the role request and the response to an augmentation service at 230. At 240, the proxy service receives a modified response from the augmentation service. The modified response is customized for the second resource by application of resource decorations to the original response. This may include changing access permissions and/or restrictions of the active roles associated with the second resource. Additionally, the customization may include altering the format and syntax of the response. Optionally, at 241, the proxy service identifies a resource profile received from the augmentation service wherein the augmentation service identifies the resource profile in response to an identified relationship among the role request, the first resource, and role assignments associated with the second resource. Thus, the relationship between the role request, the first resource, and the roles associated with the second resource determine which resource profile that was selected. The proxy service may select more than one resource profile; additionally, a selected resource profile may be used to select additional resource profiles.

According to an embodiment, at 242, the proxy service identifies resource decorations received from the augmentation service wherein the augmentation service selected the decorations in response to the identified resource profile.

At 250, the proxy service sends the modified response to the first resource. The first resource enforces the access permissions and restrictions contained in the response against the second resource.

In one embodiment, at 251, the method 200 may be implemented as a plug-in to a RCE. In another embodiment, at 252, the method 200 may be implemented as modifications within an RCE. According to yet another embodiment, at 253 the method 200 may by implemented as a proxy service that interacts with a RCE and PEP service.

Figure 3:
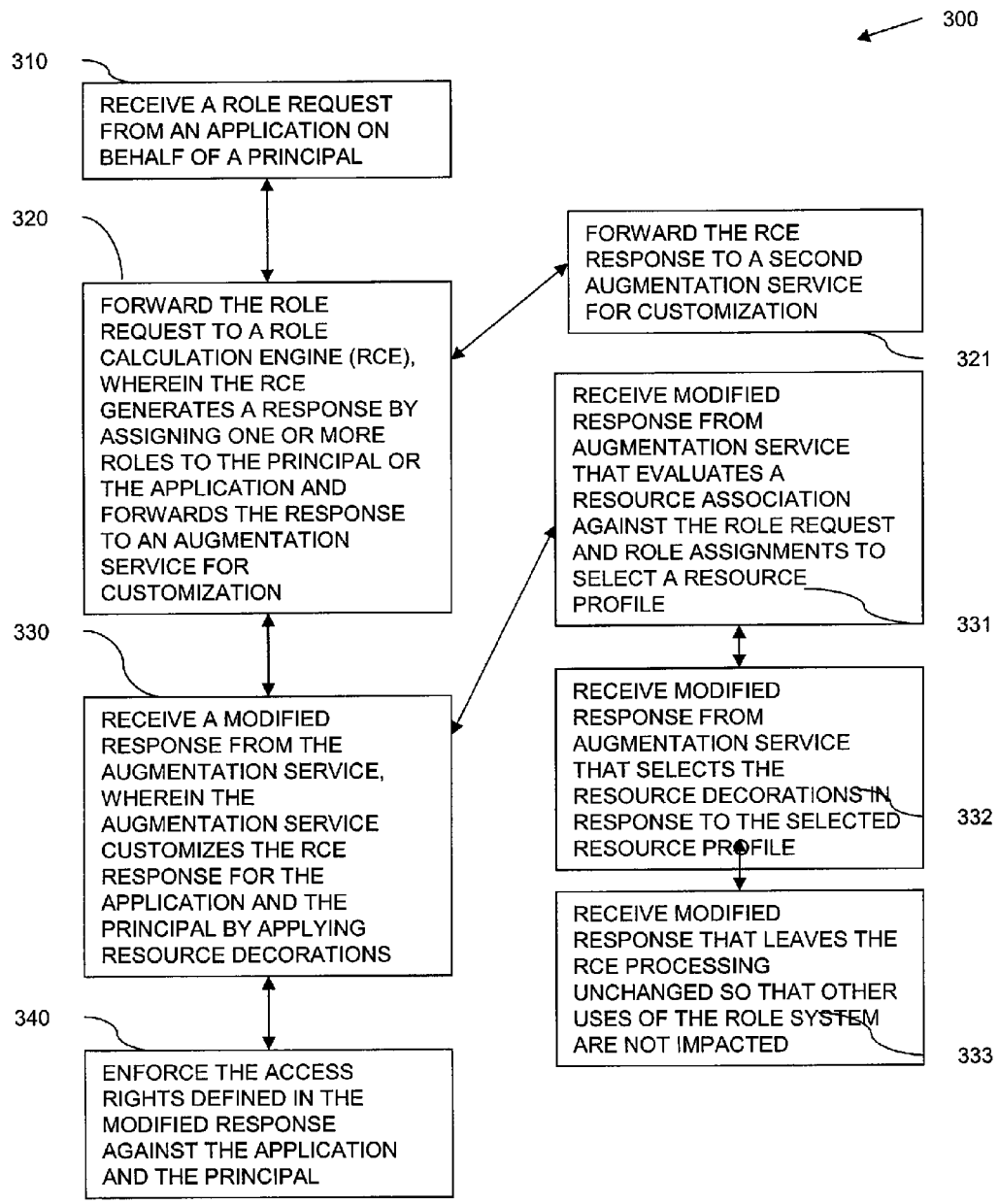
FIG. 3 is a diagram of a method for receiving and enforcing fine-grained access restrictions against an application and a principal, according to an example embodiment.

FIG. 3 is a diagram of a method 300 for receiving and enforcing fine-grained access restrictions against an application and a principal, according to an example embodiment. The method 300 (hereinafter "PEP service") is implemented as instructions in a machine-accessible and readable medium. The instructions when executed by a machine perform the functions depicted in the FIG. 3. The processing is also operational over and performs within a network. The network may be wired, wireless, or a combination of wired and wireless.

At 310, the PEP service receives a role request from an application on behalf of a principal. The same PEP service may administer or service dispositions for more than one application or principal.

At 320, the PEP service forwards the role request to a RCE. An RCE generates a response by assigning one or more roles associated with the principal or with the application and forwards the response to an augmentation service for customization. Alternatively, the RCE may forward the response to another PEP service and the response may be "intercepted" by an augmentation service.

Two or more augmentation services may be "chained" together via their augmentation calculators. Optionally, at 321, the RCE response may be forwarded from one augmentation service to another augmentation service as necessary for customization. Some augmentation services may be logic specific for particular applications.

According to an embodiment, consumer and maintenance Application Programming Interfaces (API) are associated with the PEP service. Further flexibility is created by allowing applications to change PEP services and PEP chaining associated with API and management functions. For example, this allows an application to specify that, after a particular application decoration has been associated with a role, the role may not be further modified without the PDP service that represents the application ensuring that the modification is acceptable. The PEP service enforces policy representing the roles and access permissions, whereas PDP services resolve or make the initial policy. The augmentation service permits general roles to be dynamically altered to achieve more granularities then a general role assignment might be capable of providing.

At 330, the PEP service receives a modified response from the augmentation service. The augmentation service has already customized the RCE response, as described in detail above, for the application and the principal by applying resource decorations.

In an embodiment, at 331, the PEP service receives decorations as part of the modified response, which is in response to actions of an augmentation service that evaluates a resource association against the role request and one or more role assignments to select a resource profile. The augmentation service may also select a resource profile based on the identity of the principal and require that the principal authenticate a true identity. In still another embodiment, at 332, the PEP service may have also received the decorations (via the modified response) in response to the augmentation service that selects the resource decorations in response to the identified resource profile. The augmentation service applies the resource decorations to the response, customizing the response for the requesting application and principal and embodying this customization in the modified response. At 333, the PEP service may receive the modified response and corresponding decorations in such a manner from the augmentation service that the RCE processing is left unchanged so that other uses of the RBAC system are not impacted by the augmentation that was achieved via the augmentation service.

At 340, the PEP service enforces the access rights and/or restrictions contained in the modified response against the application and principal. In this manner, fine-grained access restrictions may be realized. Such granular security enforcement may even be used to ensure regulatory restrictions are being satisfied with respect to security.

Figure 4:
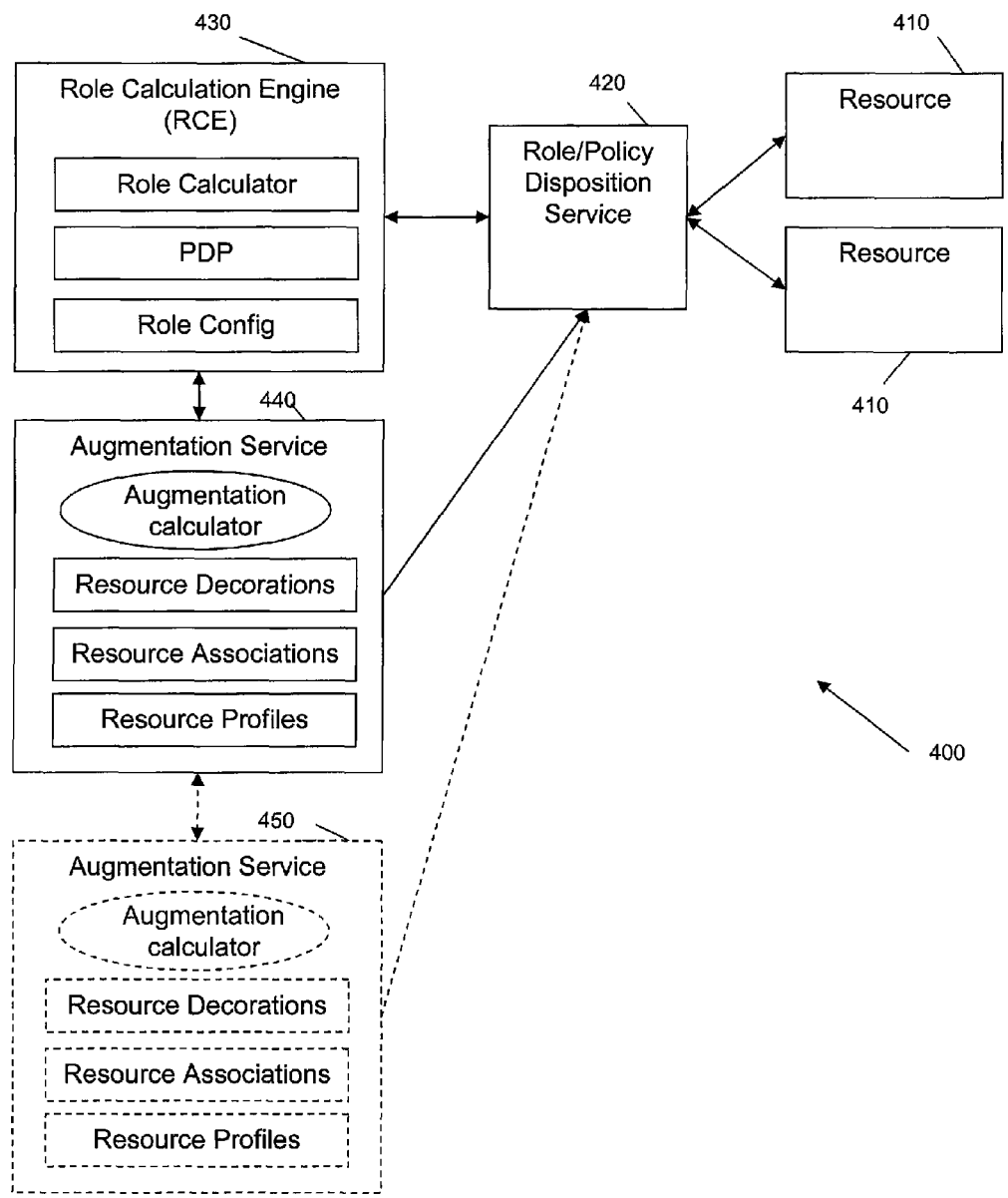
FIG. 4 is a diagram of a role extension system, according to an example embodiment.

FIG. 4 is a diagram of a role extension system 400 that allows disparate systems to add role functionality without impacting other systems/services using a role management system/service, according to an example embodiment. The role extension system 400 is implemented as instructions in a machine-accessible and readable medium. The instructions when executed by a machine perform, among other things, at least some of the processing depicted in FIGS. 1-3. The role extension system 400 is also operational over a network and the network may be wired, wireless, or a combination of wired and wireless.

The role extension system 400 includes a Role/Policy Disposition service 420 and an augmentation service 440; each of which are discussed in more detail below. In some cases, the role extension system 400 may also include one or more resources 410, a RCE 430, and additional augmentation services 450.

The Role/Policy Disposition service 420 was at least partially described in detail above, especially with reference to the method 200 of the FIG. 2. The Role/Policy Disposition service 420 is an intermediary adapted to receive role requests from one or more resources, often applications or principals, and forward those requests to a RCE 430 or cause those requests to be forwarded to the RCE 430. Further, the Role/Policy Disposition service 420 is adapted to receive customized role request responses from an augmentation service 440 and enforce access permissions and restrictions included in the responses against processing actions of the requesting resource. In some cases, the Role/Policy Disposition service 402 may enforce role transformations produced by the augmentation service 440. So, it may not just be restrictive role augmentations, any role transformation, perhaps even including a role expansion, may occur via the augmentation service 440. A given Role/Policy Disposition service may handle role requests for multiple resources and enforce role policy decisions, including transformations, access restrictions and permissions, against multiple resources. Resources 410 may be applications, services, devices, principals, or applications acting on behalf of principals. An Application Programming Interface (API) may be associated with the Role/Policy Disposition service 420. A resource 410 may configure the Role/Policy Disposition service 420 through the API or chain multiple Role/Policy Disposition service 420 together with one another.

The augmentation service 440 was described in detail above, especially with reference to role the role extension service represented by the method 100 of the FIG. 1. The augmentation service 440 has access to resource decorations, resource associations, and resource profiles. Additionally, the augmentation service 440 may have communication channels between the RCE 430, the Role/Policy Disposition service 420, and other augmentation services 450. The augmentation service 440 is adapted to receive role requests and role responses from the RCE 430. The role requests and role responses may be "intercepted" by the augmentation service 440 unbeknownst to the RCE 430. Role responses may include role assignments made by the RCE 430.

The augmentation service 440 is adapted to customize an RCE response for the Role/Policy Disposition service 420, for resources 410, or for other applications or principals. The augmentation calculator modifies the role response according to the resource decorations, resource associations, and resource profiles that form part of the augmentation service. The augmentation service 440 customizes the response for the requesting resource, adjusting access permissions and restrictions as necessary and may also apply a processing context to the response to fulfill formatting or syntax requirements of the requesting resource (e.g. to accommodate a legacy application, etc.).

The augmentation service 440 is further adapted to indirectly (via the RCE 430) or directly send the customized response to the Role/Policy Disposition service. Thus, it is possible to configure the augmentation service 440, including the resource decorations, resource associations, and resource profiles, to allow multiple, disparate systems/services that are related by the role specifications to add role functionality without affecting other systems/services using the role management system/service.

One or more augmentation services 450 may be connected to the augmentation service 440. Augmentation services 450 operate in a manner similar to that described above with respect to augmentation service 440. The augmentation services 440 and 450 may send responses to and receive responses from one another or from other augmentation services (not shown in FIG. 4) that are chained together. In this manner, augmentation services may dynamically consult one another and pre- or post modify a role request response.

Figure 5:
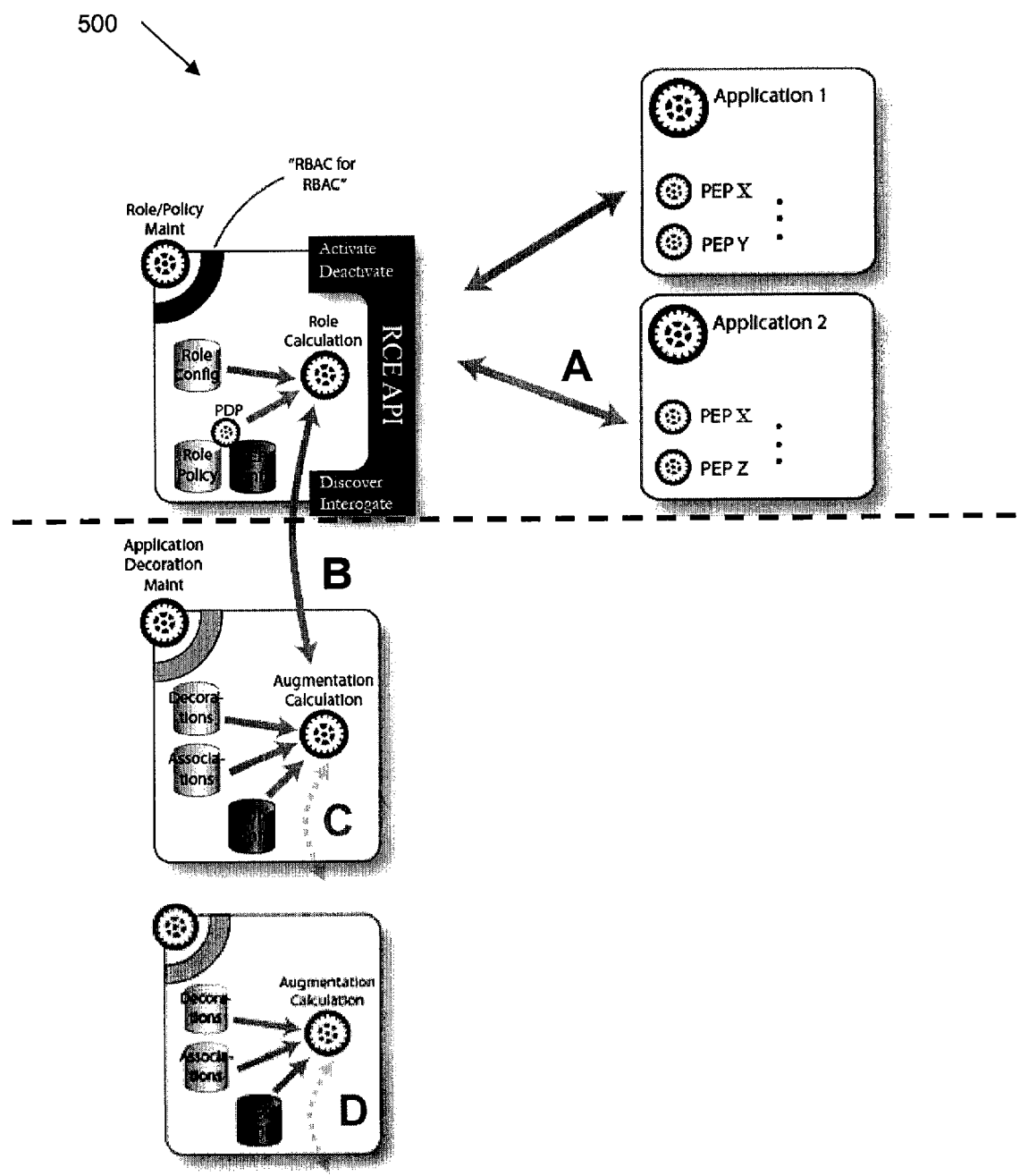
FIG. 5 is a diagram of example interactions for an architecture associated with the methods depicted in FIGS. 1-3, according to an example embodiment.

FIG. 5 is a diagram of example interactions for an architecture associated with the methods depicted in FIGS. 1-3, according to an example embodiment. The diagram includes a variety of resources and interactions that these resources have with one another for purposes of extending generic role definitions without altering existing uses of the Role Based (RB) system. The components depicted above the dashed line may in some cases represent an existing RB system/service that may exist in the prior art. The components below the dashed line represent mechanisms for extending role functionality without impacting an existing role management system. Namely, an augmentation service is shown comprising an augmentation calculator, a resource decoration module, a resource association module, and application config module. An application config module is synonymous with a resource profile module in this context. The functionality and operation of these resources has been described in detail above. Interactions between the resources are labeled with uppercase alphabetic characters A-E.

The character A represents the transmission of a role request from PEP X on behalf of application 2 to the RCE where one or more roles are assigned. The RCE transmits the role request and role assignments via channel B to an augmentation module for modification. The modified response is also sent back over B to the RCE. Optionally, the augmentation calculator may pass the response via C to another augmentation module before the response is returned to PEP X via B to the RCE and then via A to PEP X. The response may be further transmitted via D to additional augmentation modules; D may also represent the transmission of a role question to invoke PEP X on behalf of application 2, if a PEP service resides or is implemented within the RCE.

The techniques presented herein provide mechanisms necessary to allow multiple, disparate systems that are related only by the role specifications to add role functionality without affecting other applications, services, or systems using a role management system/service. The methods and systems described above provide PEP and application specific role extensions to coarse-grain role definitions that leave the general role definition intact. Among other benefits, enterprises may now more easily convert to a role management system/service and better administer role management systems/services as user diversity is exposed by new applications, departments, or users being added to the enterprise. Thus, provisioning fine-grained access permissions which reflect constantly changing user responsibilities within a more manageable processing environment is made easier.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented in a computer-readable storage medium and processed by a machine as a role extension service, comprising:

receiving, by the role extension service on the machine, a role request and role assignment, the role request identifies a requesting Policy Enforcement Point (PEP) service and a principal, the PEP service is acting on behalf of the principal and the role assignment represents permissible roles of that principal, the role request represents a particular request by a principal to access one or more resources and the PEP service is a module that dynamically enforces policy that includes access permissions and restrictions for access to the resources;

evaluating, by the role extension service on the machine, a resource association in response to the role request and role assignment in order to identify a resource profile by considering a relationship among the principal, the role request, the role assignment, membership inheritance requirements, and the PEP service, the relationship maps to the PEP service, and the resource profile identifies one or more resource decorations that are applied to the role assignment or the resource association;

applying, by the role extension service on the machine, the one or more resource decorations to the role assignment, each resource decoration defines a processing context for the resource association and includes access restrictions, permissions, and formatting and syntax requirements for the resource association, the one or more resource decorations are applied in response to the identified resource profile to modify the role assignment when dictated by policy;

sending, by the role extension service on the machine, a modified role assignment to the PEP service that then dynamically enforces the modified role assignment; and extending, by the role extension service on the machine, the role assignment and role functionality for an existing role management system with the modified role assignment without affecting other uses of the existing role management system and without affecting other legacy applications, services, and systems that use the existing role management system.

2. The method of claim 1, wherein receiving further includes identifying one or more of the following: the principal and an application being used by the principal.

3. The method of claim 1, wherein applying further includes generating a PEP-specific decoration.

4. The method of claim 3, further including leaving the generalized role definition unchanged.

5. The method of claim 1, wherein applying further includes formatting the role request response to accommodate interoperability requirements of a application.

6. The method of claim 1, wherein receiving further includes recognizing the role assignment as initially being unassigned a value or empty.

7. A method implemented in a computer-readable storage medium and processed by a machine as a proxy service, comprising:

receiving, by the proxy service on the machine, a role request from a first resource on behalf of a second resource;

acquiring, by the proxy service on the machine, a response that associates one or more roles with the second resource;

forwarding, by the proxy service on the machine, the role request and the response to an augmentation service, the augmentation service is an augmentation calculator that accepts as inputs one or more roles, policies associated with those roles, role requests, and role assignments and uses identified resource associations and relationships in connection with resource configurations to select a resource profile and acquire resource decorations, at least one relationship identifying membership inheritance requirements, the resource profile maps to context specific access permissions or restrictions and the resource decorations define processing contexts that include additional access permissions and additional access restrictions;

receiving, by the proxy service on the machine, a modified response from the augmentation service, the modified response is customized for the second resource by applying the resource decorations to the original response; and sending, by the proxy service on the machine, the modified response to the first resource, the first resource enforces the access restriction defined in the modified response against the second resource, where the modified response is an extension of the response originally acquired and extends role functionality of an existing role management system and without affecting other uses of the existing role management system and without affecting other legacy applications, services, and systems that use the existing role management system.

8. The method of claim 7 further including, recognizing the first resource as a Policy Enforcement Point (PEP) service and the second resource as a principal.

9. The method of claim 7 further including, implementing the method as a plug-in to a Role Calculation Engine (RCE).

10. The method of claim 7 further including, implementing the method as modifications within a Role Calculation Engine (RCE).

11. The method of claim 7, wherein acquiring further includes generating the response by dynamically associating one or more roles with the second resource.

12. The method of claim 7 further including, implementing the method as a proxy service that interacts with a Role Calculation Engine (RCE) and Policy Enforcement Point (PEP) service.

13. The method of claim 7, wherein receiving the modified response further includes, receiving the modified response from the augmentation service that selects the resource profile in response to an identified relationship among the role request, the first resource, and role assignments associated with the second resource.

14. The method of claim 13, wherein receiving the modified response further includes, receiving the modified response from the augmentation service that identifies the resource decorations, which are selected in response to the identified resource profile.

15. A method implemented in a computer-readable storage medium and processed by a machine as a policy enforcement point (PEP) service, comprising:

receiving, by the PEP service on the machine, a role request from an application on behalf of a principal;

forwarding, by the PEP service on the machine, the role request to a role calculation engine (RCE), the RCE generates a response by assigning one or more roles to the principal or the application and forwards the response to an augmentation service for customization, and the RCE evaluates the role request in terms of the roles of one or more agents and resources using role policy to make a determination concerning the role request, and the augmentation service is an augmentation calculator that accepts as inputs one or more roles, policies associated with those roles, the role request and role assignments and uses identified resource associations and relationships in connection with resource configurations to select a resource profile and acquire resource decorations, at least one relationship identifies membership inheritance requirements, the resource profile maps to context specific access permissions and restrictions and the resource decorations define processing contexts that include additional access permissions and addition access restrictions;

receiving, by the PEP service on the machine, a modified response from the augmentation service, the augmentation service customizes the RCE response for the application and the principal by applying the resource decorations; and enforcing, by the PEP service on the machine, the access rights defined in the modified response against the application and the principal, the RCE response is extended via the modified response and extends role functionality of an existing role management system and without affecting other uses of the existing role management system and without affecting other legacy applications, services, and systems that use the existing role management system.

16. The method of claim 15, wherein customizing the RCE response further includes evaluating a resource association against the role request and role assignments to select a resource profile.

17. The method of claim 16 further including, selecting the resource decorations in response to the selected resource profile.

18. The method of claim 17 further including, leaving the RCE processing unchanged so that other uses of a role management system/service are not impacted.

19. The method of claim 15, wherein receiving a modified response further includes forwarding the RCE response to a second augmentation service for additional customization.

* * * * *